United States Patent
Kong

(10) Patent No.: US 10,660,339 B2
(45) Date of Patent: *May 26, 2020

(54) CHLORINE DIOXIDE BASED FORMULATION WITH IMPROVED STABILITY

(71) Applicant: Spectrum Doxyicide LLC, Denver, CO (US)

(72) Inventor: Stephen Bradford Kong, Alamo, CA (US)

(73) Assignee: SPECTRUM DOXYICIDE, LLC, Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/997,660

(22) Filed: Jun. 4, 2018

(65) Prior Publication Data

US 2019/0364904 A1    Dec. 5, 2019

(51) Int. Cl.
    *A01N 59/08*    (2006.01)

(52) U.S. Cl.
    CPC .................. *A01N 59/08* (2013.01)

(58) Field of Classification Search
    CPC ........ C01B 11/024; A01N 59/00; A01N 25/22; A01N 59/08
    See application file for complete search history.

(56) References Cited

U.S. PATENT DOCUMENTS

| | | | | |
|---|---|---|---|---|
| 5,932,085 | A * | 8/1999 | Cowley ................. | B01D 61/00 205/499 |
| 2003/0004216 | A1* | 1/2003 | Birnbaum ............. | A01N 33/12 514/643 |
| 2005/0184273 | A1* | 8/2005 | Morelli ................. | A01N 59/00 252/187.23 |
| 2008/0226748 | A1* | 9/2008 | Stevenson ............ | A01N 59/00 424/665 |
| 2011/0256244 | A1* | 10/2011 | Abe ...................... | A01N 59/00 424/661 |
| 2015/0237864 | A1* | 8/2015 | Wood .................... | C01B 11/024 424/661 |

* cited by examiner

Primary Examiner — Blessing M Fubara
(74) Attorney, Agent, or Firm — Michael R Shevlin

(57) ABSTRACT

Disclosed are devices, systems, and methods for producing broad spectrum disinfectants, sanitizers, cleaner and deodorizers using chlorine dioxide compositions, and more particularly, to methods for producing chlorine dioxide compositions having improved long term stability by the proper choice of pH and through the careful choice of other product formula ingredients.

13 Claims, 5 Drawing Sheets

CHLORINE DIOXIDE BASED FORMULATION WITH IMPROVED STABILITY

CROSS-REFERENCE TO RELATED APPLICATIONS

This application is related to U.S. application Ser. No. 14/631,806 titled BROAD SPECTRUM DISINFECTANT, filed on Feb. 25, 2015, which claims priority to U.S. Provisional Application No. 61/945,054, filed Feb. 26, 2014, which are incorporated herein by reference.

FIELD

The present invention is generally related to broad spectrum disinfectants, sanitizers, cleaners or deodorizers using chlorine dioxide compositions, and more particularly, to methods for producing chlorine dioxide compositions having improved long term stability by the proper choice of pH and through the careful choice of other product formula ingredients.

BACKGROUND

For a product to be successful in the market place, it must have suitable shelf life stability, in addition to, providing the desired function and aesthetics. Disinfecting or sanitizing products require a suitable biocidal agent. Some examples of biocides are chlorine dioxide, hypochlorite, peroxide and quaternary amines. Many products containing reactive ingredients such a chlorine dioxide (ClO2) have problems with long-term stability, thus limiting their shelf-life. Chlorine dioxide is an effective biocide and can clean and deodorize. One particular advantage of ClO2 over hypochlorite is that ClO2 does not chlorinate organic compounds. However, it is inherently less stable than other biocides such as quaternary amines. Due to instability, most applications involve producing chlorine dioxide at the source of use. Therefore, chlorine dioxide must be properly formulated to be viable.

Products containing chlorine dioxide generally have a limited shelf life because chlorine dioxide decomposes over time even in closed bottles. Typically, unstable products will have a use by or expiration date to ensure that the product's designated performance, such as micro efficacy, is maintained throughout the time period. Manufacturing and inventory control, as well as, maintaining microbiological efficacy are therefore challenging for product with limited life-time. Due it its inherent instability, chlorine dioxide is often produced at the source using a chlorine dioxide generator. Another approach is to market a 2-Part (or multipart) product where the precursors of the active ingredients are mixed/reacted at the point of use, and then specify an appropriate time period to use the product. However, 2-Part products generally require more complex packaging, and require the consumer to perform an extra "mixing" step before using. There is also a risk that that the mixing/reacting step is not followed properly. This extra mixing step may not be desirable to the consumer and the consumer may prefer an alternative product. Yet another approach could be use a package and a trigger/pump dispenser system that keeps the reagents separated until use. In this scenario, a multiple (dual) chamber bottle equipped with a trigger/pump actuator having a dip (supply) tube inserted in each chamber such that when the trigger/pump actuator is used, aliquots from both chambers are simultaneously drawn and mixed when dispersed. This approach would require a more complex bottle and trigger/actuator due to the multiple product streams.

In view of this, it is desirable to develop a disinfectant or sanitizing or cleaner/deodorizer product that maximizes the stability of the active ingredients so that the product has a suitable shelf-life and is ready to use after manufacturing. Stable products have a longer shelf-life, better consumer appeal, and are easier to use. A stable product can use conventional package that are readily available and cheaper.

SUMMARY

In one aspect, the invention is a method of making chlorine dioxide compositions having improved long term stability by the proper choice of pH. A number of synthesis reactions are known for producing chlorine dioxide. The preferred method is the acidification of chlorite.

The method includes adding a first amount of the stoichiometric excess of acid solution, such as hydrochloric acid solution, to a second amount of sodium chlorite that is dissolved in water with agitation/mixing. After the reaction goes to completion, adding a third amount of sodium hydroxide to adjust the pH of the resulting chlorine dioxide solution to a target value suitable for long term stability.

In one aspect, a sample of pH adjusted chlorine dioxide solution is produced using:
  the first amount=17 g 10% hydrochloric acid solution; which is added to the second amount=1.28 g NaClO2 (80%) dissolved in 981.7 g deionized water
  After 10-15 minutes, add
  the third amount=36.2 g of 5% sodium hydroxide.

In another aspect, the invention is a method of making chlorine dioxide compositions with a surfactant having improved long term stability by the proper choice of pH. The method includes adding a first amount of acid solution to a second amount of sodium chlorite dissolved in deionized water; agitating the acid-sodium chlorite solution to mix the chemicals. After the reaction is complete, add a third amount of one or more surfactants to the solution, and then adding a fourth amount sodium hydroxide. It is also possible to add the acid to a solution containing both sodium chlorite and the surfactant and after the reaction is complete, then add the fourth amount of sodium hydroxide.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

DETAILED DESCRIPTION

Figure 1:
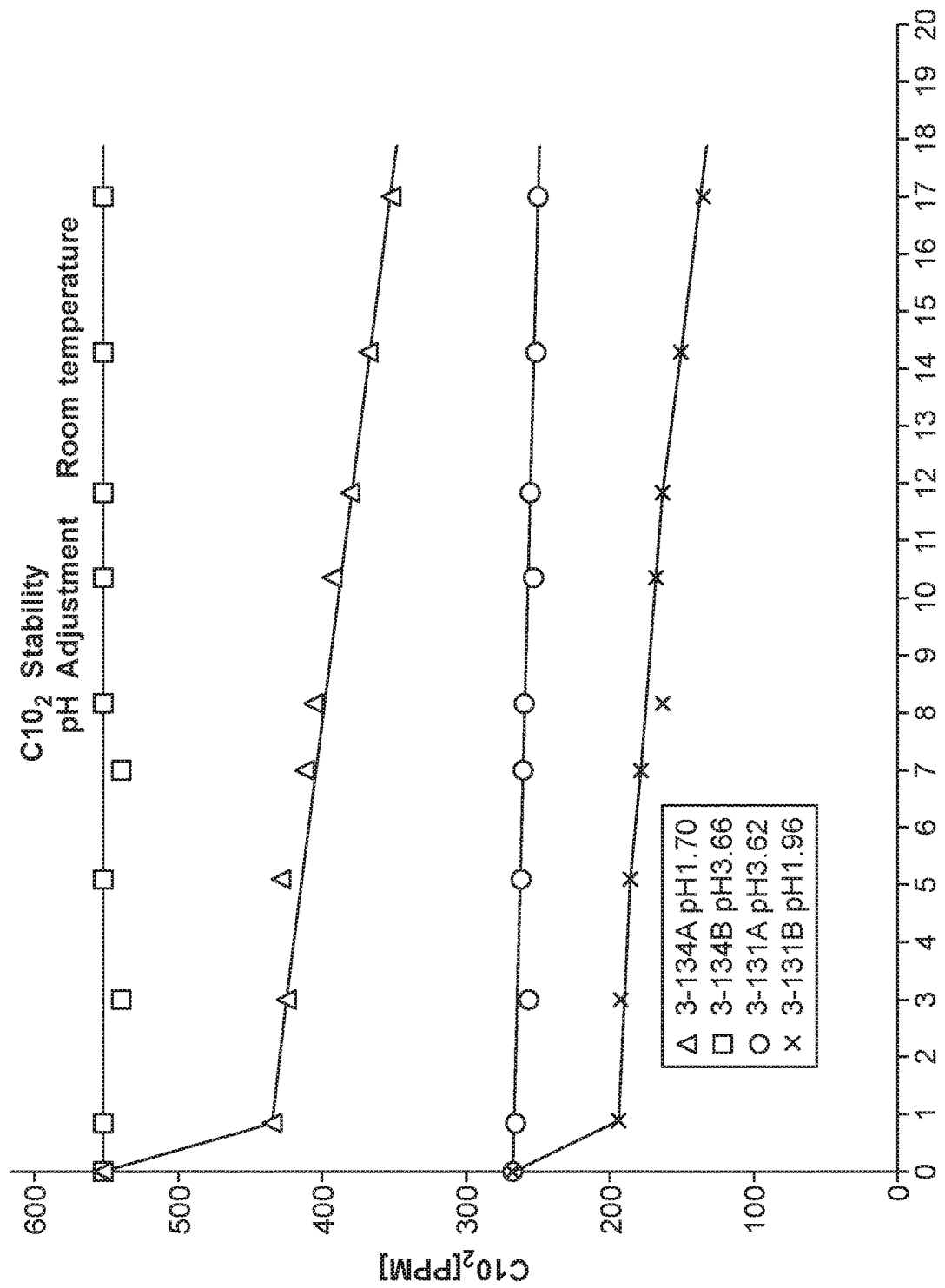
FIG. 1 shows a stability profile of chlorine dioxide compositions with differing pH levels vs. time.

Embodiments of the invention will now be described with reference to the figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

The present invention is directed to improve the stability of chlorine dioxide (ClO2) compositions and products. The inventor has found that the stability of the chlorine dioxide can be significantly improved by the proper choice of pH, and through the careful choice of other product formula ingredients. By maximizing the stability of chlorine dioxide, the product has a suitable shelf-life and is ready to use after manufacturing. This stabilization benefit applies regardless of the reaction method used to produce chlorine dioxide.

The improved stability of ClO2 is due to adjusting the pH. The relationship between pH and stability may not be recognized, and that could explain the limited number of ClO2 based product in the market. The increased stability of ClO2 would make a product more desirable than a similar product with limited shelf-life, or a product that must be mixed prior to use.

Chlorine dioxide (ClO2) can be produced by a number of reactions with sodium chlorite (NaClO2). Several industrial methods of synthesis of chlorine dioxide are known such as acidification of chlorite, oxidation of chlorite by chlorine, oxidation of chlorite by persulfate. Other suitable reactions include the reaction of acetic anhydride with chlorite, the reduction of chlorates by acidification in the presence of oxalic acid, and the reduction of chlorates by sulfurous anhydride. Acidification of chlorite according to the following reaction is particularly appealing due to the availability, cost and ease of use of hydrochloric acid. It is understood that regardless of the method used to produce chlorine dioxide, the stability of the solution is controlled by pH and the proper choice of other ingredients.

Any suitable acid may be used in the process disclosed. For example, but not limited to, hydrochloric acid, sulfuric acid, nitric acid, phosphoric acid, acetic acid, citric acid, sulfamic acid, succinic acid and oxalic acid.

Acids may be moderate to strong acids that are capable of reacting with sodium chlorite to form ClO2. The strongest acids are "mineral acids." Common examples are hydrochloric acid, sulfuric acid, nitric acid, phosphoric acid. These are characterized as having pKa values <1. Strong acids react very quickly with sodium chlorite.

Moderately strong include many organic acids. Examples include acetic acid, citric acid, sulfamic acid, succinic acid and oxalic acid. These are characterized as having pKa values pKa about 5. The acid needs to react with sodium chlorite to form ClO2. If the pka is too high, the reaction will not occur or will be very slow. The lower the pKa, the stronger the acid and the faster the reaction with sodium chlorite.

The process may also include a caustic, such as sodium hydroxide to adjust the solution pH (Reference: Chlorine Dioxide by W. J. Masschelein, Ann Arbor Sciences 1979.)

For example, sodium chlorite (NaClO2) and hydrochloric acid (HCl), shown in Formula (1).

$$4HCl + 5NaClO_2 \rightarrow 4ClO_2 + 2H_2O + 5NaCl \qquad (1)$$

It is generally desirable to have an excess of HCl because it helps speed the reaction and maximizes the conversion of NaClO2 to ClO2. The resulting pH of samples typically produced this way is pH<2.

Example 1

A first batch of ClO2 (3-134), prepared as described in Formula (1) was split into two subsamples. The pH of one subsample was adjusted to pH 3.66 with Sodium Hydroxide (NaOH) (3-134A) and the other subsample was not adjusted and was pH 1.70 (3-134B). A second batch of ClO2 (3-131), prepared as described in Formula (1) at a lower concentration of ClO2 split into two subsamples. The pH of one subsample was adjusted to pH 3.62 (3-131A) and the second subsample was not adjusted and was pH 1.96 (3-131B). The samples were stored in closed amber glass jars. At various times, aliquots were removed and the ClO2 was assayed using the iodometric titration.

FIG. 1 is a plot of the ClO2 concentration vs. time for the samples. As seen in the plot, increasing the pH results in a much more stable product, i.e. slower loss of the ClO2 concentration over time. Raising the sample pH also has the key benefit of preventing the initial rapid drop in ClO2 typically seen in the first few days after synthesis of ClO2. Preventing this initial drop in activity is more cost effective for manufacturing and makes it easier to achieve the desired concentration.

Example 2

Figure 2:
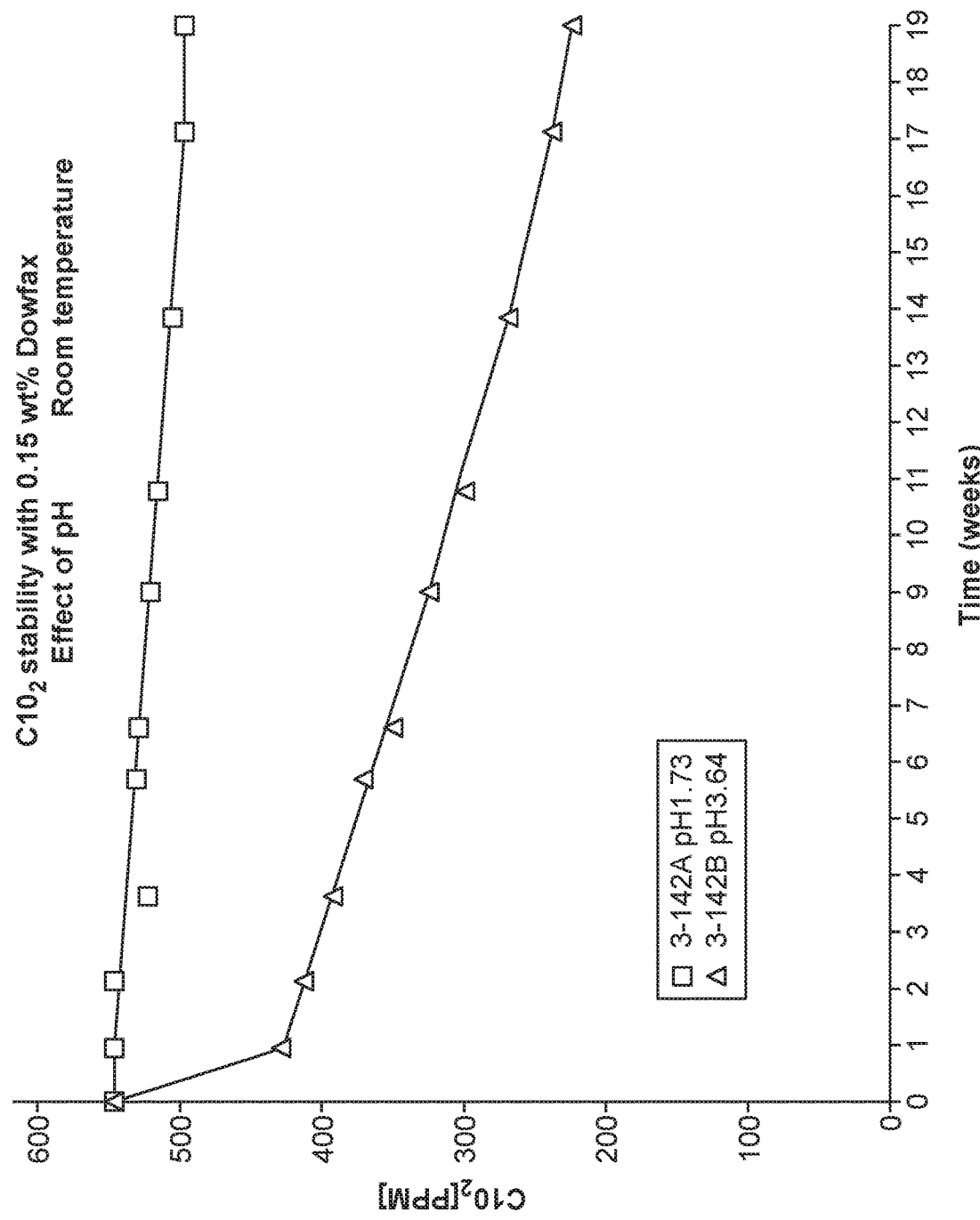
FIG. 2 shows a stability profile of chlorine dioxide and surfactant compositions with differing pH levels vs. time.

FIG. 2 shows a stability profile of another set of samples with surfactant added (3-142), in this case, Dowfax 3B2 surfactant. The ClO2 (3-142) was prepared as described in Formula (1) and split into two subsamples. The pH of one subsample was adjusted to pH 3.64 (3-142B) with Sodium Hydroxide (NaOH) and the other subsample was not adjusted and was pH 1.73 (3-134A). Both samples were stored in closed amber glass jars. At various times, aliquots were removed and the ClO2 was assayed using the iodometric titration. FIG. 2 is a plot of the ClO2 concentration with vs. time. This plot again shows increasing the pH to 3.64 results in a much more stable product than the pH 1.73 sample, i.e. slower loss of the ClO2 concentration over time.

Example 3

Figure 3:
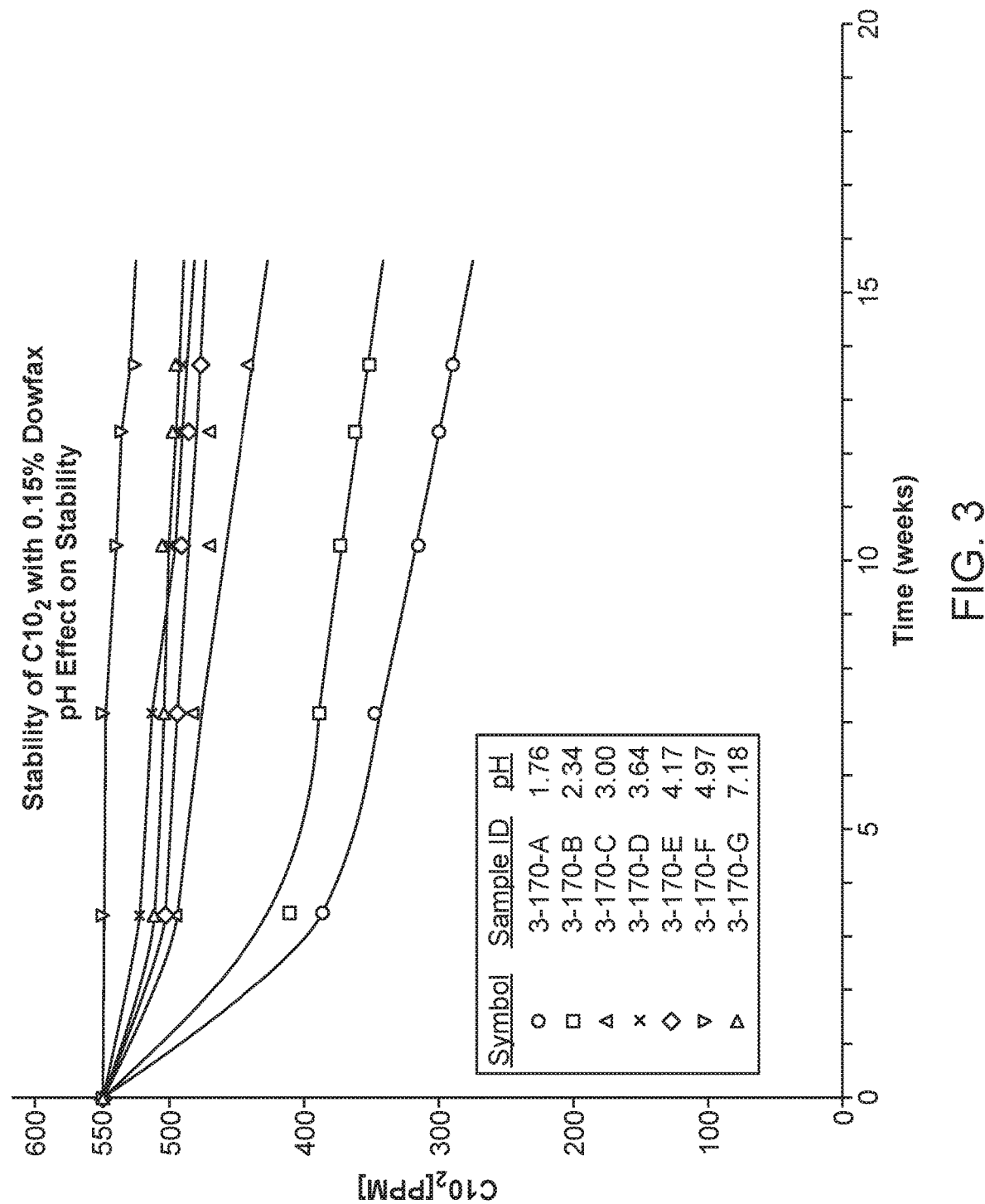
FIG. 3 shows a stability profile of chlorine dioxide and surfactant compositions with differing pH levels vs. time.

FIG. 3 shows a stability profile of another set of samples with surfactant added (3-170), in this case, Dowfax 3B2 surfactant. FIG. 3 is similar FIG. 2 but with samples at a broader range in pH. The ClO2 with surfactant was prepared as described and split into seven subsamples. The pH of the first subsample 3-170A was not adjusted and was pH 1.76. The pH of the other subsamples 3-170B to 3-170G were adjusted with Sodium Hydroxide (NaOH). All samples were stored in closed amber glass bottles.

3-170 A pH 1.76
3-170B adjusted to pH 2.34
3-170C adjusted to pH 3.00
3-170D adjusted to pH 3.64
3-170E adjusted to pH 4.17
3-170F adjusted to pH 4.97
3-170G adjusted to pH 7.18

FIG. 3 shows the effect of pH on stability. The graph shows raising the pH in subsamples 3-170B to 3-170G improved stability. However, sample 3-170G with pH 7.18 was not as stable as the samples as pH 4.97 (3-170F), suggesting there may be an optimal pH range for stability where pH ~5 appears to have better stability than pH 3.6.

Example 4

Figure 4:
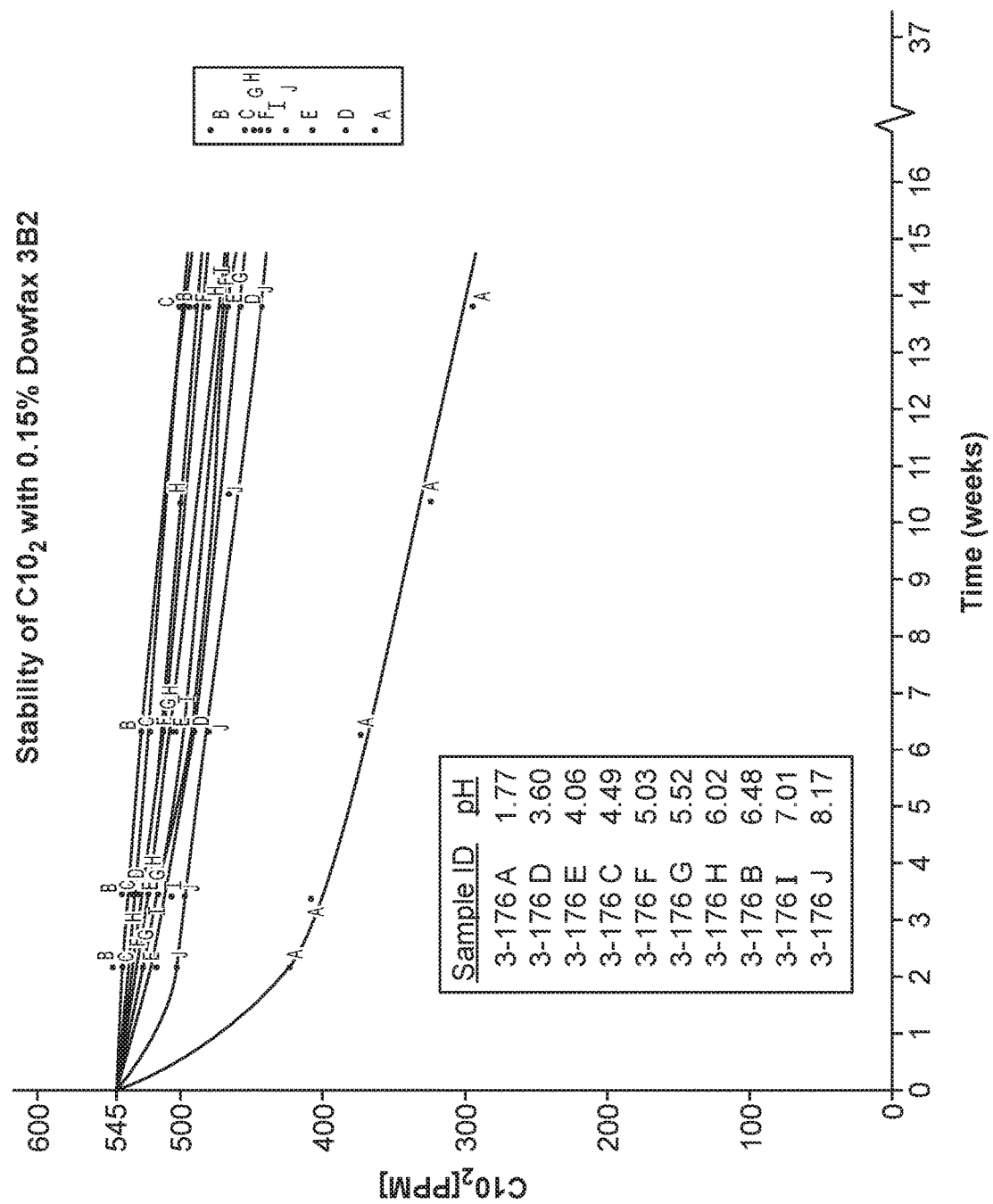
FIG. 4 shows a stability profile for a series of samples with Dowfax 3B2.

FIG. 4 shows the stability profile for yet another series of samples with Dowfax 3B2 (Sample series 3-176A-J). The same procedure was used in preparing the samples. A large sample batch was prepared which was then split into ten sub samples. The pH of the subsamples were adjusted by addition of sodium hydroxide. The samples were stored at room temperature in closed amber glass bottles. At various times, aliquates from the subsamples were removed and the concentration of ClO2 was assayed using an iodometric titration. The sample pH's were checked and adjusted if necessary to the original sample pH. The initial concentration of ClO2 was 545 PPM. Table A shows the concentration of ClO2 and the corresponding calculated percent remaining based on the initial concentration at 6, 14 and 37 weeks.

TABLE A

| Sample pH | 6 week | | 14 week | | 37 weeks | |
|---|---|---|---|---|---|---|
| | ClO2 PPM | Percent Remaining | ClO2 PPM | Percent Remaining | ClO2 PPM | Percent Remaining |
| 1.77 | 377 | 69.2 | 298 | 54.7 | 162 | 29.8 |
| 3.60 | 493 | 90.4 | 460 | 84.4 | 386 | 70.8 |
| 4.06 | 508 | 93.2 | 460 | 86.1 | 410 | 75.3 |
| 4.49 | 526 | 96.5 | 503 | 92.3 | 459 | 84.2 |
| 5.03 | 515 | 94.5 | 487 | 89.4 | 458 | 84.1 |
| 5.52 | 516 | 94.7 | 484 | 88.8 | 440 | 82.4 |
| 6.02 | 520 | 95.4 | 483 | 88.6 | 451 | 82.8 |
| 6.48 | 528 | 96.9 | 496 | 91.0 | 450 | 82.6 |
| 7.01 | 503 | 92.3 | 473 | 86.8 | 442 | 81.1 |
| 8.17 | 482 | 88.4 | 447 | 82.0 | 427 | 78.3 |

Sample 3-176 A-J

Figure 5:
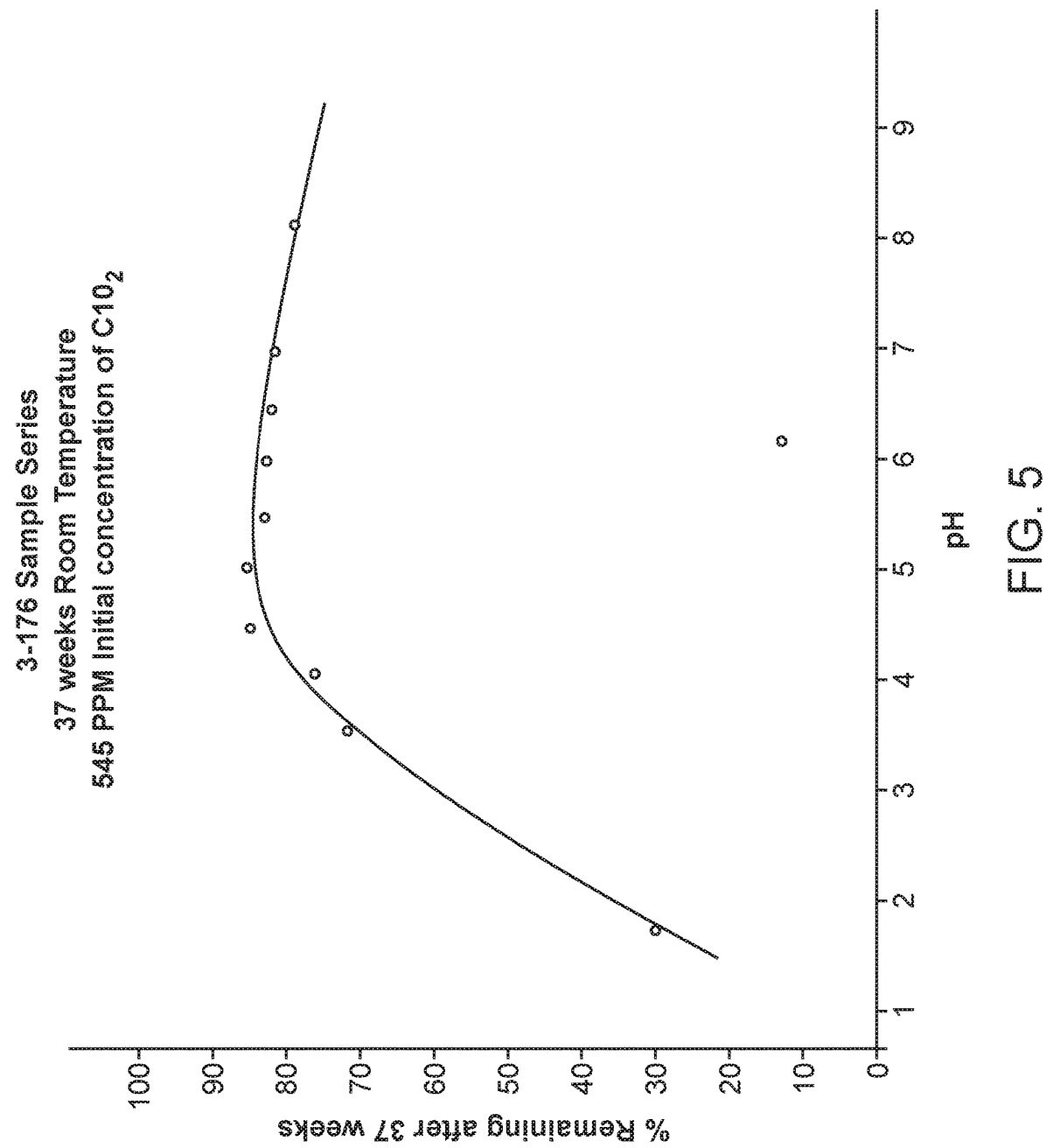
FIG. 5 shows a plot of the percent of ClO2 remaining as a function of pH.

FIG. 5 shows a plot of the percent of ClO2 remaining as a function of pH at the T=37-week data using the data from Table A. The profile shows the improved stability resulting from increasing the samples pH with the optimal pH at ~5 consistent with the data shown in FIG. 4.

General Instruct Ions

All chemicals are used without further purifications. All samples bottles used were amber and appropriately labeled. Each container was rinsed with deionized water before reusing.

All processes and reactions are carried out at room temperature not exceeding (22° C.) unless otherwise specified.

The present invention may be used for various products, including, for example, a surface disinfectant or sanitizer. While the present application discloses embodiments for a surface disinfectant, it is contemplated that the same processes, methods and solutions may be used for the other products.

Basic Solution

Below is one example of chlorine dioxide based final formulation with improved stability.
 1 Hydrochloric acid solution (HCl).
 2 Sodium chlorite (NaClO2).
 3. Sodium Hydroxide (NaOH)
 4 Deionized water ($H_2O$).

Chlorine Dioxide Composition Products Types

Table 1 below shows a base solution composition used for disinfectant/sanitizer solution depicted in FIG. 1 3-134 A/B. As described above, NaClO2 is dissolved in deionized water. The aliquot of 10% HCl was added. The mixture is stirred and allowed to react for 15 minutes. The batch was then split into two 11 subsamples.

TABLE 1

| | pH adjusted Base Solution | | | |
|---|---|---|---|---|
| Product type | 1 | 2 | 3 | 4 |
| Disinfectant | 34.10 g 10% HCL | 2.56 g | See below | 1963 g H2O |

32 g of 5% NaOH was added to a 1 liter sample of 3-134B with a resulting pH of 3.66

32 g of $H_2O$ was added to Samples 3-134A to insure the identical volume both samples. The pH of 3.134A was 1.70.

Surfactant Solution

Below is one example of chlorine dioxide-based formulation having a surfactant with improved stability.
 1 Hydrochloric acid solution (HCl).
 2 Sodium chlorite ($NaClO_2$).
 3. Surfactant (for example, DOWFAX 3B2).
 4. Sodium Hydroxide (NaOH)
 5 Deionized water ($H_2O$).

Table 2 below shows some example ranges as used in FIG. 2.

TABLE 2

| | pH adjusted with Surfactant (g/liter) | | | | |
|---|---|---|---|---|---|
| Product type | 1 | 2 | 3 | 4 | 5 |
| Disinfectant | 17 g 10% HCL | 1.28 | 1.5 | 16 g 5% NaOH | 980 |

Chlorine dioxide (ClO2) decomposes more quickly when exposed to light, is temperature sensitive and it reacts with many organic compounds. Proper shielding from light and clean production facilities and handling procedures, and material purity are essential to improve stability and avoid unwanted reactions with organic contaminants during production.

The resulting concentration of chlorine dioxide can be tailored to meet the desired biocidal performance. As with many biocidal products, the product of the concentration and the contact time I.e. cxt=constant. As a simplistic approximate relationship, doubling the concentration can result in a reduction of concentration to yield a similar degree of micro efficacy. Table 3 shows typical ranges of ingredients to produce sanitizer/disinfecting/deodorizing solutions. It is understood that a practical method of making a very dilute solution of chlorine dioxide, at concentrations as low as 1 PPM, can be prepared by further dilution of a more concentrated solution using deionized water. The lower limit represents the stoichiometric limit from Formula 1. The upper limit of HCl assumes a several fold molar excess of HCl to speed the reaction rate.

| Component | Wt Percent |
|---|---|
| NaClO2 | 0.0050-0.90 |
| HCl | 0.0016-10.64 |
| Surfactant | 0.01-1.5 |
| Sodium Hydroxide | 0-0.9 |
| Deionized water | balance |
| Total | 100.0 |

Production Process

The production of chlorine dioxide solutions may be performed batch-wise or in continuous mode. Batch production is normally carried out in a single pot process, wherein the different components are added to a reaction container under a protocol as described in exact detail below. For continuous production, a special continuous mode reactor is used.

Preferably, the entire production process for the solution would be conducted under clean room conditions, in order to minimize the possibility of contamination of the solution by environmental contaminants, such as airborne particles. All contact surfaces, including without limitation surfaces of production equipment, filling equipment and packaging, should be thoroughly cleaned of contaminants prior to use.

Batch Process for Preparation of Chlorine Dioxide

Ranges for the amounts of the Solutions to be used for each embodiment are shown in Tables 1 & 2 above.

1. Prepare the mixing vessel by decontaminating the container with chlorine dioxide followed by a rinse with deionized water. If the container is used regularly, the container may be rinsed with only deionized water.
2. Add deionized water corresponding to size of the batch followed by the sodium chlorite. Allow the sodium chlorite to completely dissolve. Agitate the sodium chlorite solution.
3. Add the hydrochloric acid to the sodium chlorite solution. After the hydrochloric acid is added, the vessel should be loosely capped to allow the release of any gas that may have formed in the container. The amount of gas formed will vary depending on the concentrations of hydrochloric acid and sodium chlorite present.
4. Allow the acid-chlorite mixture to react for 10-15 minutes with slow agitation.
5. Add the surfactant. Mix or slowly agitate to distribute the surfactant.
6. Adjust the pH with sodium hydroxide solution to achieve the target pH for a stable solution. It is recommended that a pH meter be used to monitor the pH.
7. Store samples in sealed opaque/dark containers.

In the procedure described above, it is also generally acceptable to add the surfactant to the dissolved sodium chlorite before adding the HCl. Allow the chlorite-surfactant-acid mixture to react with slow agitation and then adjust the pH with sodium hydroxide.

Continuous Process Preparation of Solution

Below shows one embodiment of a continuous process for preparing chlorine dioxide Surface Disinfectant.

A. Turn on the water pump in the reactor unit and adjust the deionized water to the desired feed rate.
B. Turn on the chemical solutions feed pumps and set the feed rates to the desired percentage of hydrochloric acid, sodium chlorite and surfactant (optional). The sodium hydroxide can be added downstream to adjust the pH.
C. Assure proper mixing of the water and chemicals.

Dilution—Preparation of Finished Product

The Solutions may be diluted with deionized water in order to form a finished product solution. The pH of the finished product solution may vary depending on the desired stability.

Surfactant and Other Adjuncts

Surfactant and other adjuncts can be added to the basic solution to create a range of products. Surfactants such as Dowfax 3B2 help facilitate cleaning and wetting of surfaces to improve the micro efficacy of chlorine dioxide. Gum thickeners can be added to thicken the product to improve contact time on a vertical surface or potentially as in a hand sanitizer. For example, gum thickeners may include, but not limited to, xanthan gum, Kelzan AP-AS (from CP Kelco), Keltrol (from CP Kelco) or other suitable gum thickener. The key is that the adjuncts must be reasonably stable with chlorine dioxide. The benefits of proper pH choice also apply to the addition of adjuncts. We are not limited to just these two ingredients. Optimizing the pH will improve stability of formula containing the desired adjuncts.

It is intended that the specification and examples be considered as exemplary only, with a true scope and spirit of the invention being indicated by the following claims. In addition, where this application has listed the steps of a method or procedure in a specific order, it may be possible, or even expedient in certain circumstances, to change the order in which some steps are performed, and it is intended that the particular steps of the method or procedure claims set forth herebelow not be construed as being order-specific unless such order specificity is expressly stated in the claim.

The invention claimed is:

1. A method for producing a disinfectant, sanitizer or a cleaner or deodorizer containing stabilized solution of chlorine dioxide comprising:

adding a first amount of acid solution to a second amount of sodium chlorite that is dissolved in water, the first amount of acid being at a molar excess concentration than the second amount of sodium chlorite;

agitating the acid solution and sodium chlorite for at least 10-15 minutes to mix the chemicals and thus allowing the chemical to react to completion; and subsequently adding a third amount of sodium hydroxide to adjust the pH of the resulting chlorine dioxide solution to a target value wherein pH adjusted chlorine dioxide solution is produced using:

the first amount=17 g 10% hydrochloric acid solution; which is added to the second amount=1.28 g NaClO2 (80%) dissolved in 981.7 g deionized water After 10-15 minutes, add the third amount=36.2 g of 5% sodium hydroxide.

2. A method of making chlorine dioxide compositions with a surfactant having improved long term stability by adjustment of the pH to a desired range comprising:

adding 17 g 10% hydrochloric acid solution to 1.28 g NaClO2 (80%) dissolved in 981.7 g deionized water;

agitating the hydrochloric acid solution and NaClO2 for at least 10-15 minutes to mix the chemicals;

adding one or more surfactants that are compatible with chlorine dioxide;

slowly agitate the surfactant, hydrochloric acid solution and NaClO2 solution to distribute the surfactant; and adding 36.2 g of 5% sodium hydroxide;

where the pH is adjusted after the reaction to generate ClO2 in solution has gone to completion.

3. The method of claim 2, wherein the desired pH range is 2.3-8.2.

4. The method of claim 2, wherein the desired pH range is 3.6-7.5.

5. The method of claim 2, wherein the desired pH range is 4-3.5.

6. A method for producing a disinfectant, sanitizer or a cleaner or deodorizer containing stabilized solution of chlorine dioxide comprising:

1) adding a molar excess concentration amount of acid to an amount of sodium chlorite dissolved in an amount of water;
2) agitating the solution of acid and sodium chlorite until the reaction to form chlorine dioxide is complete; and
3) adding an amount of sodium hydroxide to the chlorine dioxide solution to adjust the pH to a target value wherein:
the molar excess concentration amount of acid=17 g 10% hydrochloric acid solution;
the amount of sodium chlorite=1.28 g NaClO2 (80%);
the amount of water=981.7 g deionized water; and
the amount of sodium hydroxide=36.2 g of 5% sodium hydroxide.

7. The method of claim 6, wherein agitating the acid solution and sodium chlorite is done for at least 10-15 minutes.

8. The method of claim 6, wherein varying the ratio of molar excess concentration amount of acid versus the amount of sodium chlorite increases or decreases the reaction rate time to completion.

9. The method of claim 6, wherein the pH target value is 2.3-8.2.

10. The method of claim 6, wherein the pH target value is 3.6-7.5.

11. The method of claim 6, wherein the pH target value is 4-3.5.

12. A method for producing a disinfectant, sanitizer or a cleaner or deodorizer containing stabilized solution of chlorine dioxide comprising:
1) adding a molar excess concentration amount of acid to an amount of sodium chlorite dissolved in an amount of water;
2) agitating the solution of acid and sodium chlorite until the reaction to form chlorine dioxide is complete;
3) adding an amount of surfactant to the acid solution and sodium chlorite;
4) slowly agitating the surfactant, acid solution and sodium chlorite to distribute the surfactant; and
5) adding an amount of sodium hydroxide to the chlorine dioxide solution to adjust the pH to a target value;

wherein:
the molar excess concentration amount of acid=17 g 10% hydrochloric acid solution;
the amount of sodium chlorite=1.28 g NaClO2 (80%);
the amount of water=981.7 g deionized water; and
the amount of sodium hydroxide=36.2 g of 5% sodium hydroxide.

13. The method of claim 12, wherein varying the ratio of molar excess concentration amount of acid versus the amount of sodium chlorite increases or decreases the reaction rate time to completion.

* * * * *